United States Patent
Bottrell et al.

(10) Patent No.: US 6,587,252 B1
(45) Date of Patent: Jul. 1, 2003

(54) PHOTON MODULATION, DISTRIBUTION, AND AMPLIFICATION SYSTEM

(75) Inventors: Donald G. Bottrell, Freeland, WA (US); Todd M. Capser, Billings, MT (US)

(73) Assignee: R&D Limited Liability Partnership, LLP, Billings, MT (US)

( * ) Notice: Subject to any disclaimer, the term of this patent is extended or adjusted under 35 U.S.C. 154(b) by 0 days.

(21) Appl. No.: 09/923,111

(22) Filed: Aug. 6, 2001

(51) Int. Cl.$^7$ .............................................. G02F 1/153
(52) U.S. Cl. ........................ 359/275; 359/246; 359/299
(58) Field of Search ...................... 359/11, 154, 180–83, 359/189, 192–3, 238, 240, 245–48, 257, 258, 276, 333, 337.3, 337.5, 337.12, 483–485, 558, 275, 299

(56) References Cited

U.S. PATENT DOCUMENTS

| | | | |
|---|---|---|---|
| 3,683,679 A | * 8/1972 | Brenden et al. ............... 73/603 |
| 5,335,548 A | 8/1994 | Kalibjian ...................... 73/655 |
| 5,337,183 A | * 8/1994 | Rosenblatt ................... 359/248 |
| 5,625,484 A | 4/1997 | Coutsomitros .............. 359/244 |
| 5,659,415 A | 8/1997 | Staver et al. ................ 359/244 |
| 5,753,300 A | 5/1998 | Wessels et al. .......... 427/126.3 |
| 5,785,898 A | 7/1998 | Hofmeister et al. ........ 252/584 |
| 5,986,808 A | 11/1999 | Wang .......................... 359/585 |
| 6,034,809 A | 3/2000 | Anemogiannis ............ 359/254 |
| 6,043,940 A | * 3/2000 | Kamiyama et al. ......... 359/719 |
| 6,122,091 A | 9/2000 | Russell et al. .............. 359/245 |
| 6,243,508 B1 | * 6/2001 | Jewell et al. .................. 385/14 |

OTHER PUBLICATIONS

Schrof W. et al: "Nonlinear Optical Properties of Polyelectrolyte Thin Films Containing Gold Nonoparticles Investigated by Wavelength Dispersive Femtosecond Degenerate Four Wave Mixing (DFWM)" Advanced Materials, VCH, Verlagsgesellschaft, Weinheim, DE, vol. 10, No. 4, Mar. 4, 1998.

Katayama K. et al., "Detection of Photoinduced Electronic, Thermal, and Acoustic Dynamics of Gold Film Using A Transient Reflecting Grating Method Under Three Types of Surface Plasmon Resonance Conditions", Physical Review, B. Condensed Matter, American Institute of Physics, New York, US, vol. 58, No. 13, Part 1, Oct. 1, 1998.

\* cited by examiner

*Primary Examiner*—Jordan M. Schwartz
*Assistant Examiner*—Jessica Stultz
(74) *Attorney, Agent, or Firm*—Luedeka, Neely & Graham, P.C.

(57) ABSTRACT

An optical communication device includes a first photon source emitting a first beam modulated with information. The first beam intersects a thin metal film and engenders a first surface plasmon wave thereon. Part of the first beam reflects from the metal film to form a reflected beam. A polarization structure rotates the polarization of the reflected beam. A reflecting structure reflects the reflected beam to form a second beam propagating back toward the film, which beam passes through the polarization structure again. On the metal film, the second beam engenders a second surface plasmon wave. Interaction between the first and second surface plasmon waves creates a surface plasmon standing wave. A second source provides a third beam intersecting the first and second beams at the metal film. Interaction between the third beam and the surface plasmon standing wave modulates the third beam as it passes through the metal film.

28 Claims, 8 Drawing Sheets

PHOTON MODULATION, DISTRIBUTION, AND AMPLIFICATION SYSTEM

FIELD

The present invention relates to an optical communication or modulation device. In particular, the present invention relates to an optical communication device in which information borne by a first beam of photons is controllably passed to a second beam of photons that is thence distributed to a set of photon receptor elements. Further, the present invention relates to spectral information in the second beam of photons that is diffracted into multiple parts by surface plasmons to provide spatial separation of different wavelengths in the second beam of photons. Further, the invention relates to amplification of an optical communication signal.

BACKGROUND

Photon signal processing has an increasing importance in telecommunications and data processing. In optical communication systems, it is often necessary to analyze, energy-amplify, process, or distribute photon signals that are particularly brief or rapidly changing. In such systems, it is desirable to minimize processing and distribution time. It is also desirable to spatially separate and distribute information content in a rapid and controllably varying manner. In many applications, processing or distribution elements of an optical communication system should provide response times of the order of femtoseconds, and have passbands extending up into the petahertz range. Fiber optic transmission networks which incorporate opto-electronic, electro-optic, opto-mechanical, or other devices involving physical electronics or electrodes have response times that are generally too slow and passbands that are generally too narrow.

What is needed, therefore, is a system having a faster response time and broader bandwidth than is currently available for modulating, amplifying, and/or distributing brief and rapidly varying photon signals.

SUMMARY

The above and other needs are met by an optical communication device having a first photon source, such as an infrared laser, for providing a first beam of photons modulated with information. The device includes an intersection plane for intersecting the first beam of photons at a first angle of incidence and for reflecting a first portion of the first beam of photons to form a reflected beam of photons propagating at a second angle of incidence. A polarization rotating structure is provided to rotate the polarization of the reflected beam of photons. A reflecting structure reflects the reflected beam of photons to form a second beam of photons. The second beam is passed through the polarization rotating structure to rotate the polarization of the second beam of photons. The intersection plane receives the second beam of photons at the second incidence angle, and intersects the second beam of photons with the first beam of photons. In a most preferred embodiment of the invention, a film layer at the intersection plane supports a first surface plasmon wave formed by the first beam of photons and a second surface plasmon wave formed by the second beam of photons. Interaction between the first and second surface plasmon waves on the film layer forms a surface plasmon standing wave. A second photon source, such as an ultraviolet laser, provides a third beam of photons which passes through the film layer at the intersection of the first and second beams of photons. As the third beam of photons passes through the film layer, the surface plasmon standing wave modulates the third beam with the information carried by the first beam.

Also in a preferred embodiment, the surface plasmon standing wave on the film layer is operable to scatter the third beam of photons in a diffraction pattern having a central peak portion and side peak portions spatially disposed on either side of the central peak portion. Some preferred embodiments include a first photon collection device, such as a photodetector, which is operable to receive the first peak portion, and at least one second photon collection device operable to receive at least one of the side peak portions.

In an alternative embodiment, the invention provides an optical communication device that includes a first photon source, such as a laser, for emitting a first beam of photons in a first direction, where the first beam of photons is modulated with information. A beam splitter receives the first beam and divides the first beam into second and third beams of photons. A beam directing structure directs the second beam in a second direction, and directs the third beam in a third direction which is different from the second direction. The second and third beams intersect at an intersection plane, there being a second incidence angle between the second beam and the intersection plane, and a third incidence angle between the third beam and the intersection plane. The device has a second photon source, such as a laser, for emitting a fourth beam of photons that intersects the second and third beams at the intersection plane. The device further includes a film layer, such as a metal film, disposed at the intersection plane which is transmissive to the fourth beam of photons. Based on interaction between the second, third, and fourth beams on the film layer, the fourth beam is modulated with the information as the fourth beam passes through the film layer.

In another aspect, the invention provides a method for modulating a carrier beam of photons with information carried by a first beam of photons. The method includes steps of propagating a first beam of photons in a first direction, and reflecting a portion of the first beam to form a reflected beam propagating in a second direction. The reflected beam is reflected to form a second beam which is substantially collinear with the reflected beam and which propagates in a third direction opposite the second direction. The polarization of the second beam is rotated, and the second beam is intersected with the first beam at an intersection plane. The method further includes propagating a carrier beam of photons toward the intersection plane, and intersecting the carrier beam with the first and second beams at the intersection plane. Based on interactions between the first, second, and carrier beams at the intersection plane, the carrier beam is modulated with the information as the carrier beam passes through the intersection plane.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
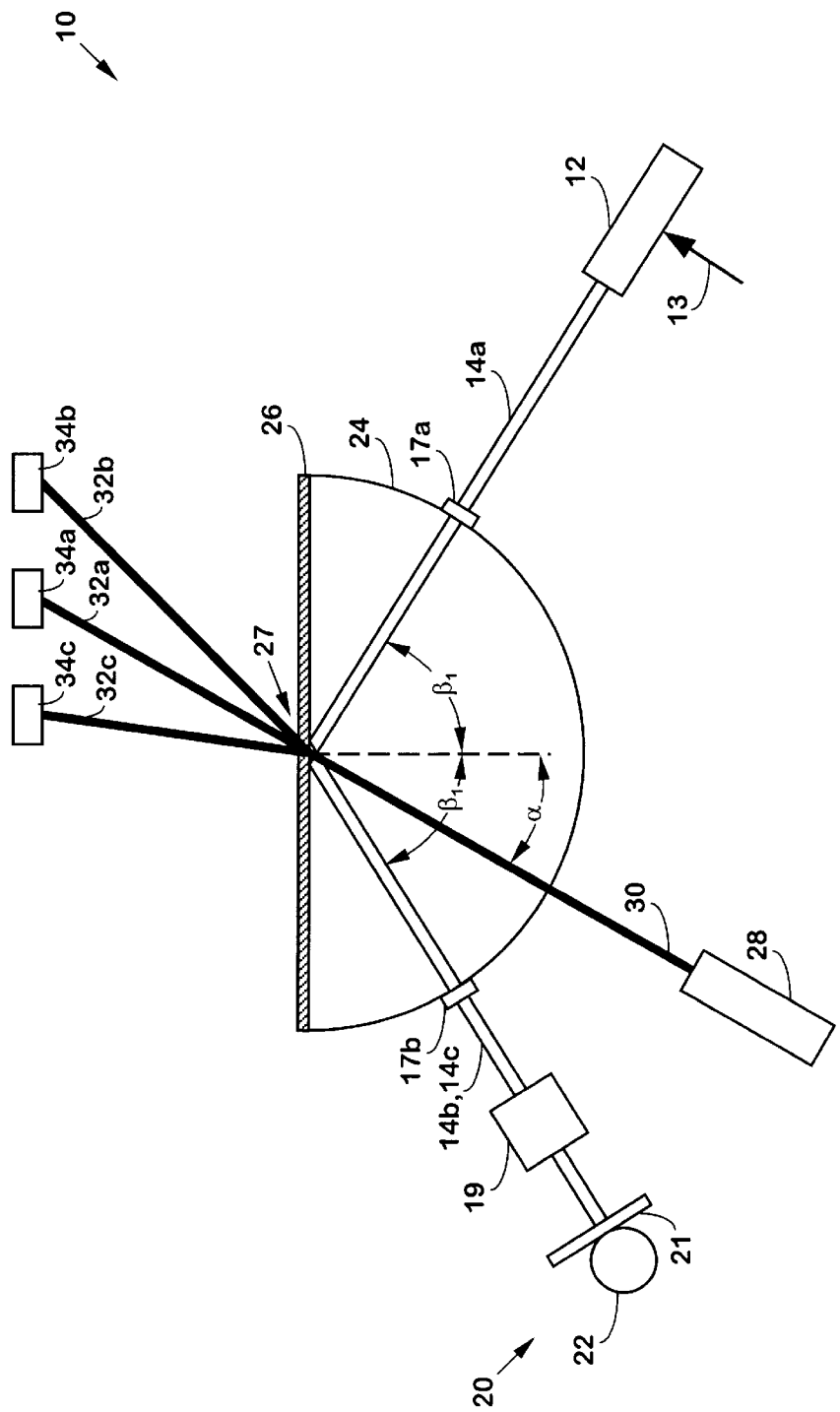
FIG. 1 depicts an optical communication system according to a preferred embodiment of the invention.
Figure 2A:
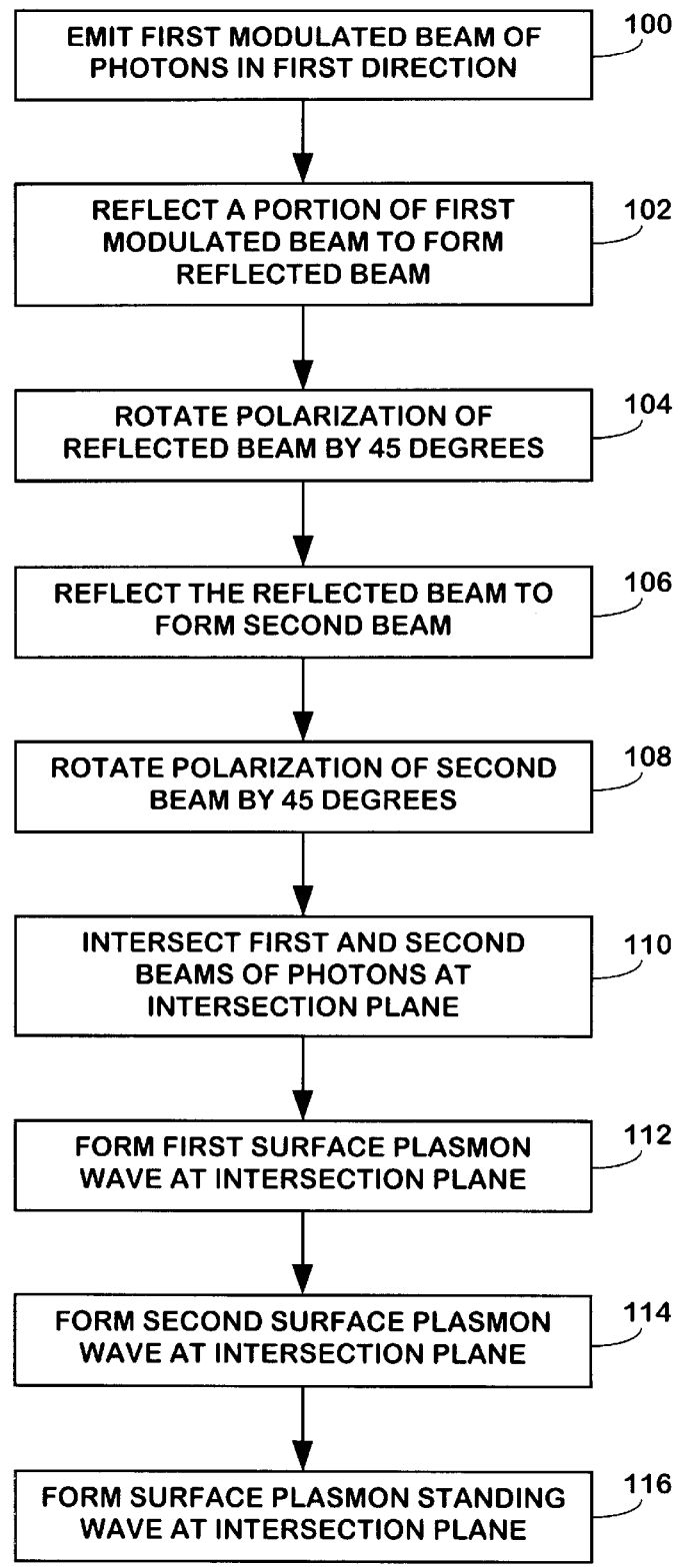
FIGS. 2A–B depict a method of optical communication according to a preferred embodiment of the invention.
Figure 2B:
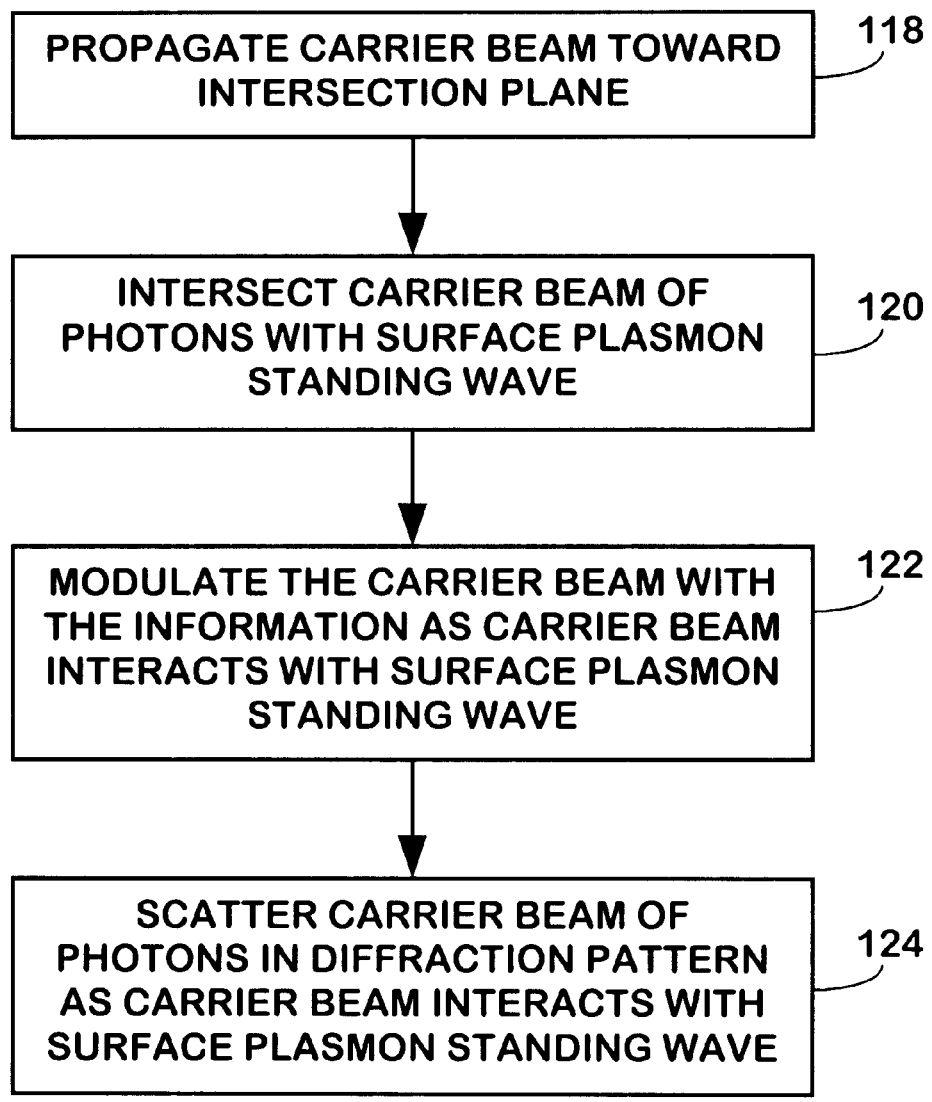

Depicted in FIGS. 1 and 2A–B is a preferred embodiment of an optical communication, amplification, and distribution system 10. The system 10 includes a first photon emission source 12, which is most preferably an infrared diode laser and modulator. The wavelength of infrared radiation emitted by the source 12 is preferably about 1.55 $\mu$m. The first photon source 12 emits a first beam of photons 14a that is modulated with information (step 100 in FIG. 2A) based on an information signal 13. The modulated first beam of photons 14a may also represent an incoming signal in an optical communication system that is to be repeated, amplified, and/or distributed by the system 10.

For purposes of this description, modulation includes any form of controlled variation of the direction, amplitude, or frequency of a beam of photons with time, where the controlled variation preferably contains the information. Elements of the information may be represented directly by instantaneous or time-interval values of the spatial directions of propagation, by the variations in amplitude, or by variation in frequency of a photon beam. Additionally, the modulation may convert a beam of photons into a succession of shaped pulses, in which case the elements of the information is represented by the shapes, the positions, the frequency content, or the intervals between the shaped pulses.

The first beam of photons 14a impinges upon an entrance element 17a which is coupled to the convex surface of a plano-convex cylindrical lens 24 using an index-matching gel. The entrance element 17a and the lens 24 are preferably fabricated from high-purity quartz, and the curvature of the inner surface of the entrance element 17a and the curvature of the outer surface of the lens 24 are preferably matched. The outer surface of the entrance element 17a that receives the beam 14a is preferably flat, and is normal to the direction of propagation of the beam 14a. Thus, the entrance element 17a serves to prevent focusing or divergence of the first beam 14a as it enters the lens 24, thereby substantially maintaining the beam cross-section.

On the planar surface of the lens 24 is a thin film 26 of a material having a negative permittivity, such as a thin film of evaporated gold. Although gold is the most preferred material for the film 26, other materials could be used, such as aluminum, silver, lithium, indium tin oxide, tin oxide, or refractory metal silicides. The film 26 is thin enough to be optically transparent, so that optical energy may be transmitted through the film 26. For a gold film 26, the preferred thickness is about five nm. The planar surface at which the film 26 resides is also referred to herein as the intersection plane.

The beam 14a impinges upon the film 26 at the intersection plane at an angle of incidence $\beta_1$ relative to a normal to the surface of the film 26. The angle of incidence $\beta_1$ is selected such that the energy and momentum of photons in the beam 14a matches that of surface plasmons in the film 26. For purposes of this description, surface plasmons are the quanta associated with collective electron motion comprising a longitudinal surface plasmon wave in the film 26.

Generally, the momentum of a surface plasmon in the film 26 is expressed as $$h/2\pi \times k,$$

where h is Planck's constant and k is the vacuum wave vector. The surface plasmon wave vector K is related to the vacuum wave vector k of the incident photons by $$K = n \times k \times \sin \beta, \quad (1)$$

where n is the index of refraction of the medium supporting the film 26, which in the preferred embodiment is the quartz lens 24. This relation of equation (1) expresses the conservation of energy of the lateral component of the plasmon momentum. Generally, the frequency, and thus the energy, of the surface plasmon should equal that of the photons in the beam 14a in order to satisfy the conservation of energy relationship. The degree of excitation of a surface plasmon is then dependent upon the complex index of refraction of the layer 26, and is determined by application of Maxwell's equations and Cartesian boundary conditions.

In the preferred embodiment, the first beam 14a is unpolarized. As the surface plasmons are excited in the film 26, a p-polarized component of the first beam 14a is absorbed in the film 26. As depicted in FIG. 1, an s-polarized component of the first beam 14a is reflected from the film 26 to form a reflected beam 14b (step 102), which forms an angle $\beta_1$ relative to the normal to the surface of the film 26. The reflected beam 14b passes through an exit element 17b, which is preferably identical in design and function to the entrance element 17a, and then through a polarization rotator 19, such as a Faraday cell, Kerr cell, or Pockels cell. In this preferred embodiment, the polarization rotator 19 is a Faraday cell, which introduces a rotation of 45 degrees to the polarization of the beam 14b (step 104). The beam 14b impinges upon a mirror 21 which is set substantially normal to the direction of propagation of the beam 14b. The radiation is reflected from the mirror 21 to form a second beam 14c (step 106), which is substantially collinear with the beam 14b, but which propagates in the opposite direction, toward the film 26. The reflected beam 14c passes through the polarization rotator 19 which imparts a polarization rotation of 45 degrees to the beam 14c in the same direction as the first rotation (step 108). Thus, the polarization of the second beam 14c upon exiting the rotator 19 is rotated by 90 degrees with respect to the polarization of the reflected beam 14b prior to entering the rotator 19. Hence, the second beam 14c is p-polarized as it passes through the element 17b and impinges upon the layer 26.

The first and second beams 14a and 14c each impinge upon the film 26 at the intersection plane at angles of incidence $\beta_1$ relative to a normal to the surface of the film 26. As depicted in FIG. 1, the beam 14a intersects with the beam 14c in an intersection area 27 on the surface of the film 26 (step 110). As discussed above, the angle of incidence $\beta_1$ is selected such that the energy and momentum of photons in the beams 14a and 14c matches that of surface plasmons in the film 26. With this preferred geometry, the beam 14a forms a first surface plasmon wave in the layer 26 which is correlated in phase to the beam 14a (step 112), and the beam 14c forms a second surface plasmon wave in the layer 26 which is correlated in phase to the beam 14c (step 114). The two oppositely directed surface plasmon waves, which are in correlated phase, interact to form a standing wave of surface plasmons (step 116).

Although the operation of the invention is not limited to any particular theory, it is helpful to think of the surface plasmon waves in the layer 26 as collective electronic displacements forming a standing array of dipoles having a dipole moment density $\rho$. Light scatters from the dipole array in a manner similar to that of light scattering from electrons in a transmission diffraction grating. This "dynamical grating" is present whenever the source 12 is on, and is not present when the source 12 is off. The grating also disappears if the frequency of the infrared radiation from the source 12 is significantly altered, or if the incidence angle $\beta_1$ is altered by more than about ±0.25 degrees, since only one frequency at a single corresponding incidence angle $\beta_1$ can excite surface plasmons.

As shown in FIG. 1, the system 10 includes a second photon emission source 28, such as a continuous-wave ultraviolet or visible light laser. The second photon source 28 emits a beam of photons 30, also referred to herein as a carrier beam or amplified beam, toward the area of intersection 27 of the beams 14a and 14c on the film 26 (step 118 in FIG. 2B). In this preferred embodiment of the invention, the carrier beam 30 is at a higher frequency, and thus has a higher energy level, than the beams 14a and 14c. The angle $\alpha$ of the carrier beam 30 relative to normal to the film 26 is variable, but is most preferably in the range of 15 to 45 degrees. However, one skilled in the art will appreciate that other values for the angle $\alpha$ could be used, and that the invention is not limited to any particular value of the angle $\alpha$.

Interaction between the electric field vector E of the carrier beam of photons 30 and the surface plasmons generates an energy density equal to the negative of the vector dot product, $-\rho \cdot E$. Generally, interaction between the carrier beam 30 and the standing wave of surface plasmons occurs if the dipole moment density $\rho$ is nonzero (step 120). If the first beam of photons 14a is amplitude modulated, the dipole moment density $\rho$ of the surface plasmons on the film 26 is likewise amplitude modulated, and hence the interaction $(-\rho \cdot E)$ is likewise modulated. In this manner, the interaction between the surface plasmons on the film 26 and the electric field of the carrier beam 30 transfers the amplitude modulation of the first beam 14a to the carrier beam 30 (step 122).

The modulation of the beam 30 occurs in a time interval determined by the response time of electrons in the film 26 at the top of the Fermi level. The time it takes light to traverse the film 26 is less than the period of the light, and thus the response frequency is actually of the order of $10^{15}$ hertz (petahertz). However, the strength of the dipoles and the coupling to the dipoles may be such that some intensity levels of light are insufficient to engender the novel type of nonlinearity provided by the invention. In such event, the plano-convex lens 24 may be constructed from a highly-polarizable nonlinear medium to augment the effect. Since the field of the surface plasmons is exponential, their electromagnetic energy density is highly concentrated near the surface of the film 26. This energy density is several orders of magnitude higher than that of the free-space wave, and the polarization is thereby greatly enhanced by the surface plasmons. Thus, the limit on response time is the response time of the electrons of the nonlinear medium over a very short distance. While this is greater than the response time of the electrons of the film 26, the response frequency is nevertheless many orders of magnitude higher than any prior method of modulation or amplification of photonic signals.

Since the dipole moment density $\rho$ is periodic with the wavelength of the surface plasmons, the interaction between the carrier beam 30 and the standing wave of surface plasmons scatters the photons of the carrier beam 30 into a diffraction pattern (step 124). As depicted in FIG. 1, the diffraction pattern includes a central diffracted energy peak 32a and higher order diffracted peaks 32b and 32c located spatially symmetrically on either side of the central energy peak. In the preferred embodiment of the invention, the diffracted energy peaks 32a, 32b, and 32c are collected by corresponding photon detection devices 34a, 34b, and 34c that are spatially arranged at points of maximum intensity of the associated diffracted energy peaks 32a, 32b, and 32c. The detection devices 34a, 34b, and 34c are preferably photosensitive detectors. Alternatively, the detection devices 34a, 34b, and 34c are optical systems or waveguides that collect the photons, and direct the collected photons to a photosensitive detector. The detection devices 34a, 34b, and 34c may also be systems for converting the photons to a different energy level for purposes of improved propagation in waveguides.

Thus, as described above, diffracted photons which are modulated with the information contained in the first beam 14a are distributed to an array of detection devices 34a, 34b, and 34c, such as may form a portion of an optical communications network. Since each detection device 34a, 34b, and 34c is assigned a corresponding portion 32a, 32b, and 32c of the modulated photons of the carrier beam 30, the information content is thereby distributed to the detection devices 34a, 34b, and 34c. Further, since the energy level of the carrier beam 30 of this embodiment is higher than that of the first beam 14a, this embodiment acts an optical energy amplifier.

Figure 3:
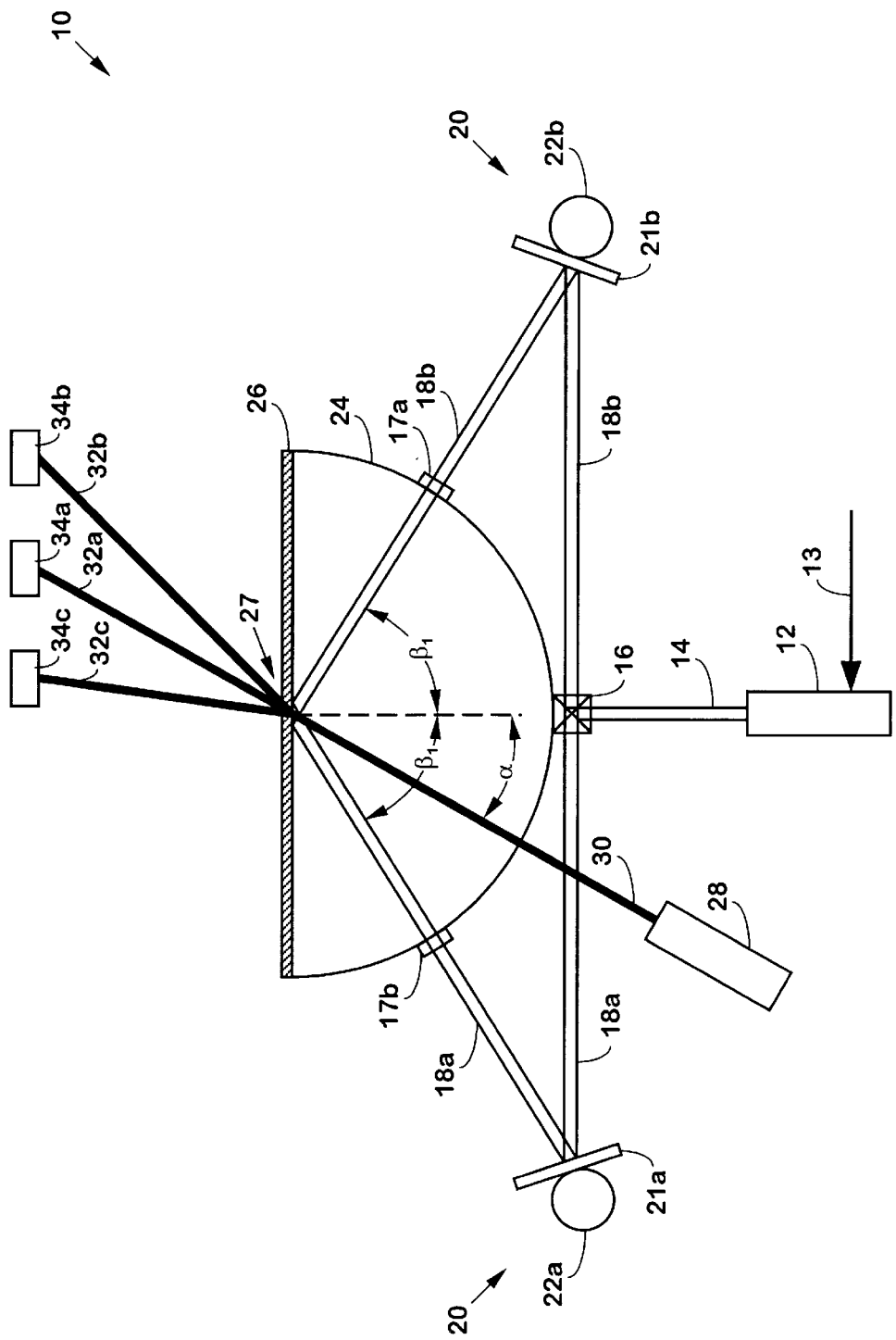
FIG. 3 depicts an optical communication system according to an alternative embodiment of the invention.
Figure 4A:
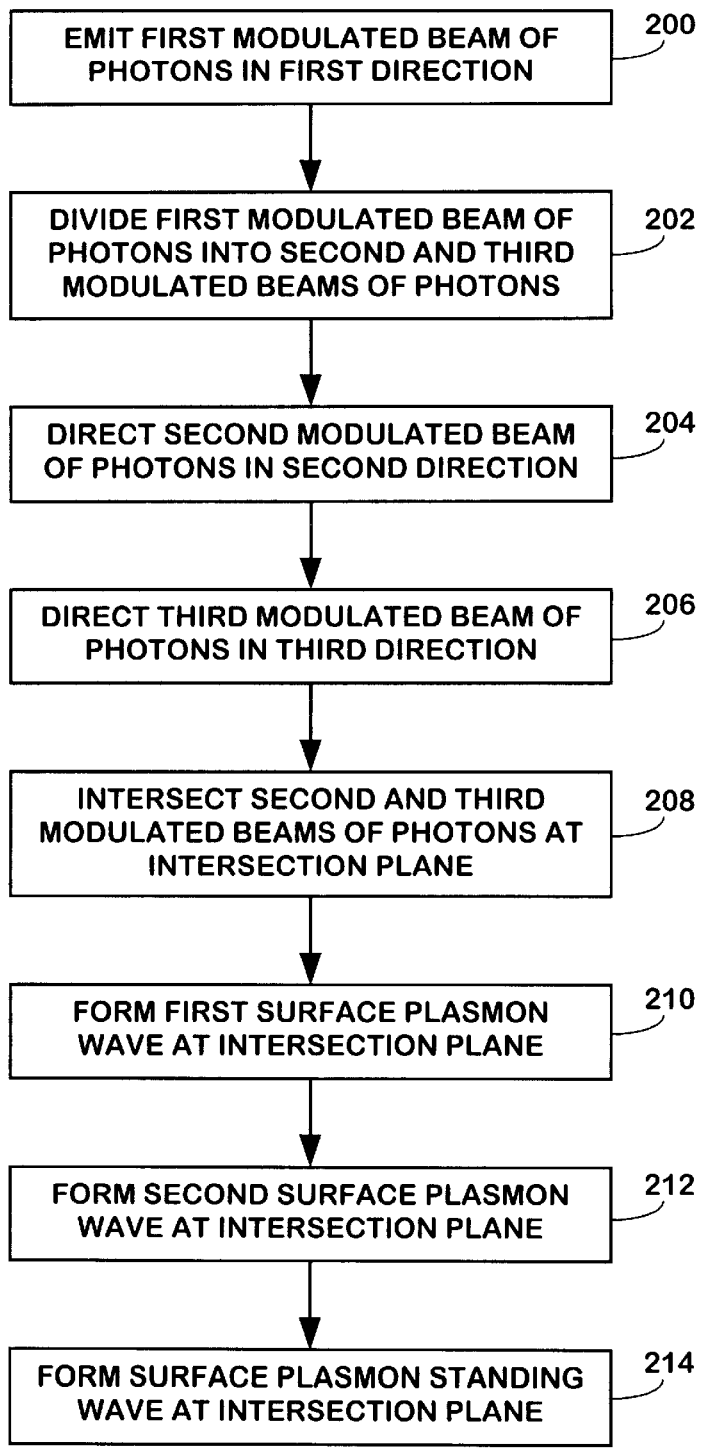
FIGS. 4A–B depict a method of optical communication according to an alternative embodiment of the invention.
Figure 4B:
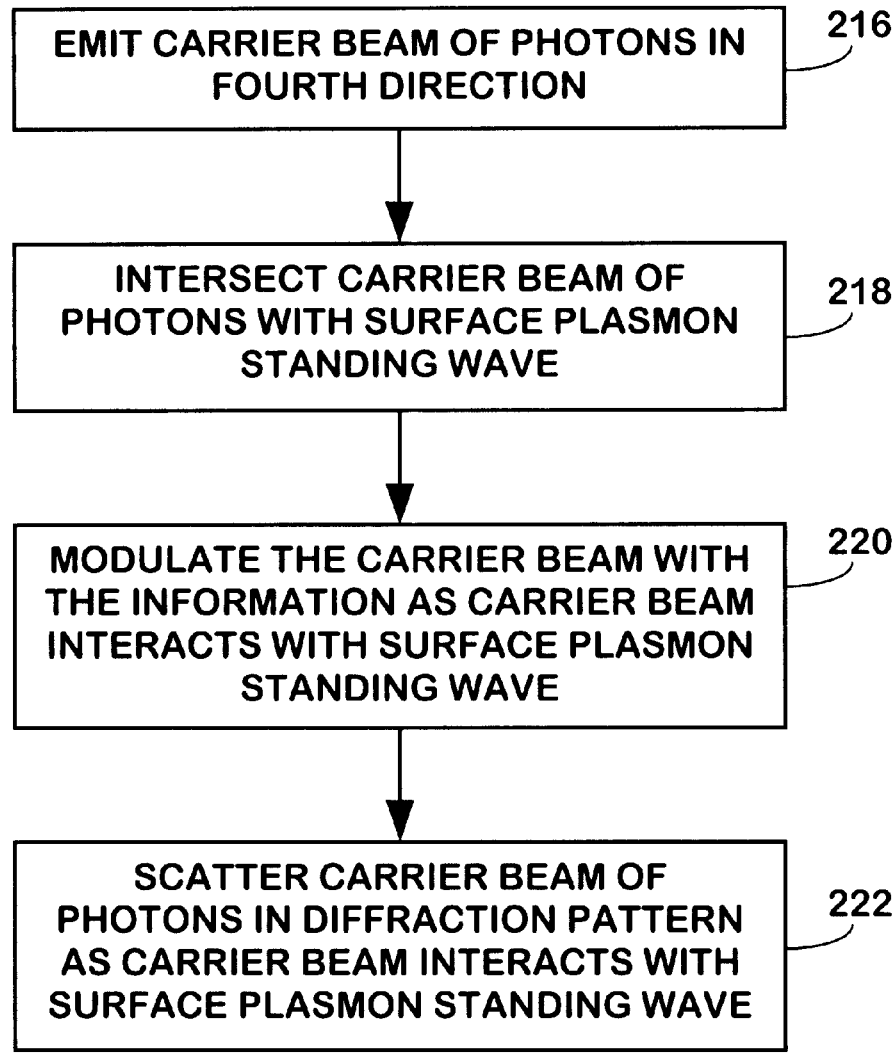

An alternative embodiment of the invention is depicted in FIGS. 3 and 4A–B. As shown in FIG. 3, a first beam of photons 14 is emitted from the source 12 in a first direction (step 200 in FIG. 4A). The first beam 14 impinges upon a beam splitter 16 which divides the first beam 14 into two preferably equal-amplitude beams, referred to herein as second and third beams of photons 18a and 18b (step 202). From the beam splitter 16, the second and third beams of photons 18a and 18b impinge upon a beam directing structure 20, which preferably includes first and second mirrors 21a–21b and mirror positioners 22a–22b. The first mirror 21a redirects the second beam of photons 18a in a second direction (step 204), and the second mirror 21b redirects the second beam of photons 18b in a third direction (step 206). As shown in FIG. 3, there is preferably an angle of $2\beta_1$ between the first and second beams of photons 18a–18b after the beams are redirected in the first and second directions. In the preferred embodiment, the distances between the beam splitter 16 and each of the mirrors 21a–21b are equivalent, thereby providing equivalent phase delays for the two beams 18a–18b for the paths traveled from the beam splitter 16.

From the mirrors 21a–21b, the second and third beams of photons 18a–18b pass through the plano-convex cylindrical lens 24, and impinge upon the film 26 at the intersection plane from the second and third directions at an angle of incidence $\beta_1$ relative to a normal to the surface of the film 26. As depicted in FIG. 3, the second beam 18a intersects with the third beam 18b in the intersection area 27 on the surface of the film 26 (step 208). Thus, the two beams 18a–18b which were split from the beam 14 are directed opposite one another, but with each incident on the layer 26 at substantially the same angle $\beta_1$ within a tolerance of about ±0.25 degrees. With this preferred geometry, the second beam of photons 18a forms a first surface plasmon wave in the layer 26 which is correlated in phase to the second beam 18a (step 210), and the third beam of photons 18b forms a second surface plasmon wave in the layer 26 which is correlated in phase to the third beam 18b (step 212). The two oppositely directed surface plasmon waves, which are correlated in phase, interact to form a standing wave of surface plasmons (step 214). The modulation of the carrier beam 30 of this embodiment occurs in substantially the same manner as described above for the preferred embodiment. Thus, steps 216–222 in FIG. 4B are performed in substantially the same manner as steps 118–124 of FIG. 2B, as described above.

Figure 5:
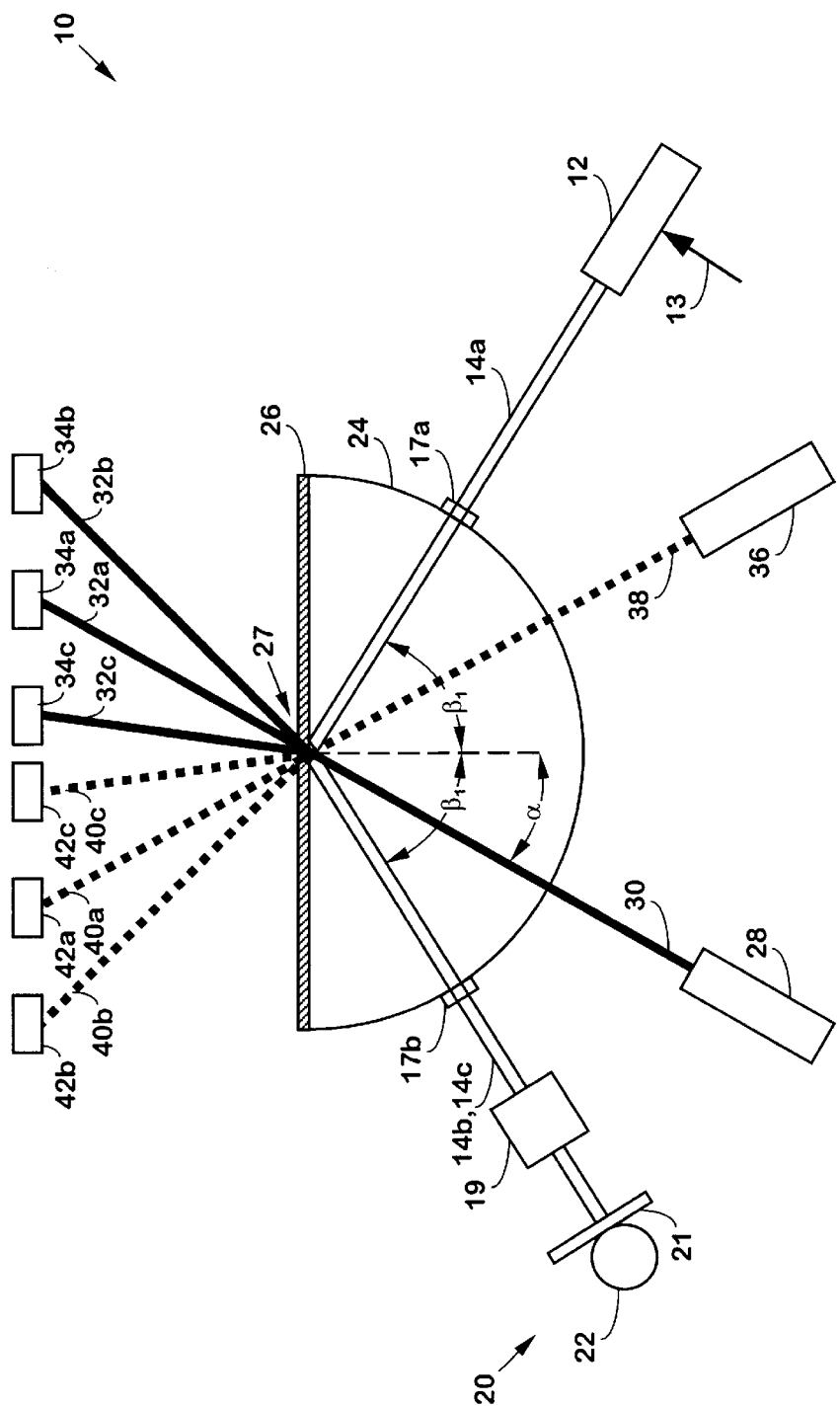
FIG. 5 depicts an optical communication system according to another alternative embodiment of the invention.

Another alternative embodiment of the invention provides for multiple carrier beams operating at different wavelengths. For example, as depicted in FIG. 5, a third photon emission source 36 may be provided, which is most preferably a continuous-wave ultraviolet or visible light laser operating at a wavelength different from that of the second photon emission source 28. The third photon emission source 36 emits a beam of photons 38, also referred to herein as a second carrier beam, toward the area of intersection 27 of the beams 14a and 14c on the film 26.

The second carrier beam 38 interacts with the standing wave of surface plasmons on the film 26 in the same manner as described above, thereby producing a central diffracted energy peak 40a and higher order diffracted peaks 40b and 40c on either side of the central energy peak 40a. Preferably, the diffracted energy peaks 40a, 40b, and 40c are collected by corresponding photon detection devices 42a, 42b, and 42c. Thus, the information modulated on the first beam of photons 14a may be transferred to the diffracted components 40a, 40b, and 40c of the second carrier beam 38.

Using the embodiment of FIG. 5, information from the first beam 14a may be passed to beams of multiple wavelengths, with photons of each wavelength distributed in different and controllable directions, where the directions are determined by the equations of diffraction. Generally, the equations of diffraction provide that the angular separation between successive orders of diffracted photons may be expressed approximately for small angles by the ratio of their wavelength to the distance between successive diffracting structure maxima. In the case of a standing wave of surface plasmons, the distance between structure maxima is one half of the surface plasmon wavelength. Thus, the angular separation between the diffracted components 40a, 40b, and 40c is predictable and controllable, and is different from the angular separation between the diffracted components 32a, 32b, and 32c. In this manner, the embodiment of FIG. 5 provides a means for controllably distributing information elements that are modulated on carrier beams of different wavelengths to spatially separated detection devices.

Figure 6:
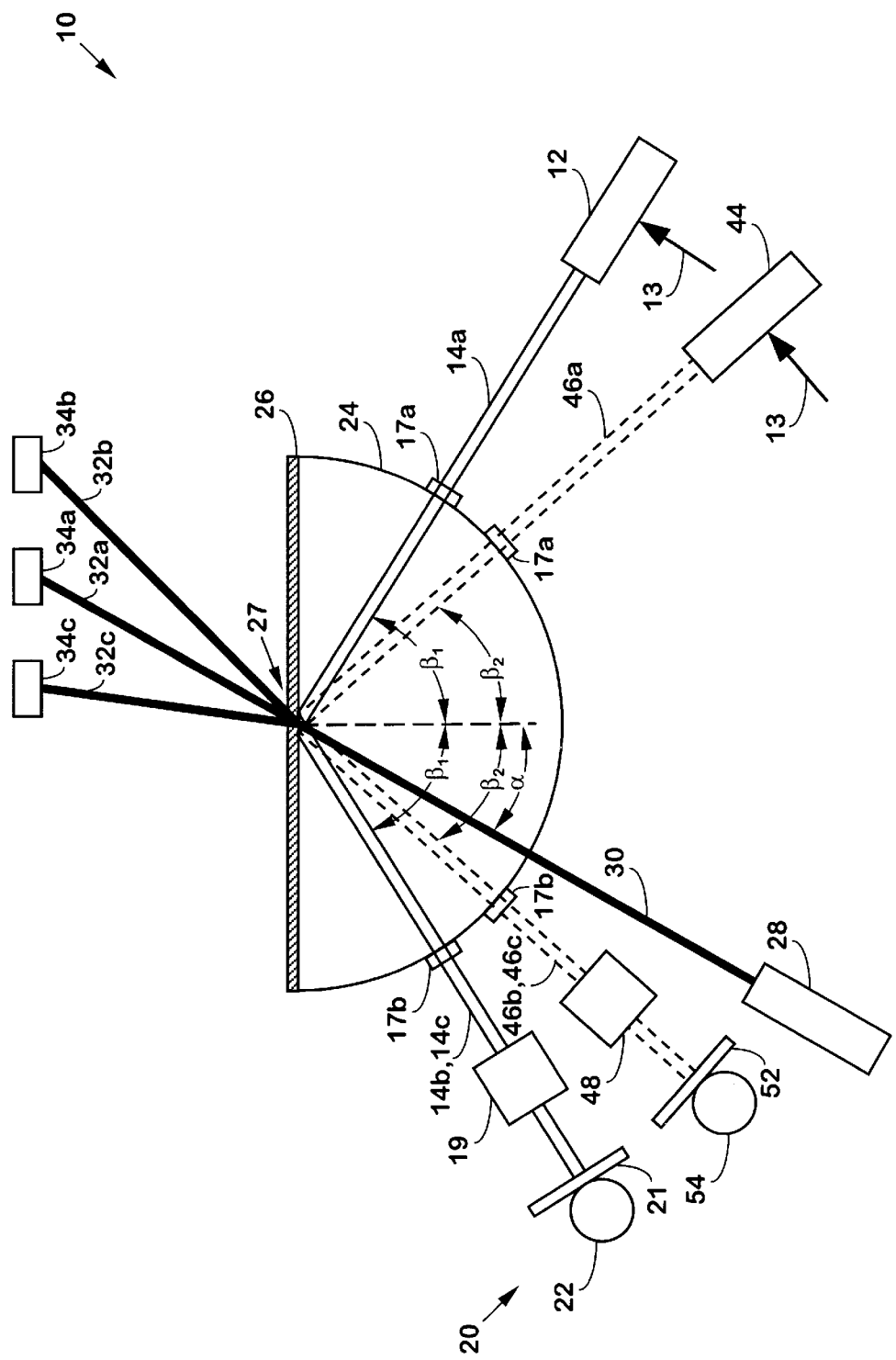
FIG. 6 depicts an optical communication system according to yet another alternative embodiment of the invention.

Yet another embodiment of the invention is depicted in FIG. 6. This embodiment provides a fourth photon emission source 44, which is most preferably a diode laser operating at an infrared wavelength different from the wavelength of the first photon emission source 12. The fourth photon source 44 emits a modulated fourth beam of photons 46a toward the film 26 at an optimal angle of incidence $\beta_2$ relative to normal to the surface of the film 26. Since the wavelength of the beam 46a is different from the wavelength of the beam 14a, the optimal incidence angle $\beta_2$ for excitation of surface plasmons is different from the incidence angle $\beta_1$. The s-polarization component of the beam 46a is reflected from the film 26 to form a beam 46b, which is reflected from a mirror 52 and polarization-rotated by a polarization rotator 48 to form a p-polarized beam 46c. The surface plasmon interaction of the beams 46a and 46c modulates the carrier beam 30 in substantially the same manner as described above. The difference in optimal incidence angles $\beta_1$ and $\beta_2$ provides for angular, and therefore spatial, separation between the mirror 52 and the mirror 21.

One of the advantages of using multiple emission sources, such as 12 and 44, is that multiple energy levels can be utilized, such as may occur in optical communication systems that use multiple energy levels. Generally, as long as the photons of the carrier beam 30 have energy below the energy of the photons of the first and fourth beams 14 and 46, operation of such an embodiment is practicable. It should be appreciated that further modulated beams at other wavelengths and incident on the film 26 from other incidence angles could also be added to the embodiment of FIG. 6.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An optical system for modulating a light beam, comprising:

means for producing first and second beams of light intersecting at an intersection plane at first and second angles of incidence, respectively, relative to a normal of the intersection plane, at least one of said first and second beams being modulated;

means for producing a third beam of light intersecting the intersection plane at a third incidence angle relative to the normal of the intersection plane;

a layer of material disposed at the intersection plane for substantially transmitting the third beam when intersecting the layer at the third incidence angle and for interacting with said first and second beams when intersecting said layer at the first and second incidence angles to produce a standing wave proximate said layer that interacts with said third beam and modulates said third beam based on the modulation of said at least one of said first and second beams.

2. The optical system of claim 1 wherein said means for producing first and second beams of light further comprise:

a first light source for providing the first beam of light modulated with information;

the intersection plane for intersecting the first beam of light and for reflecting a first portion of the first beam of light to form a reflected beam of light propagating at the second angle of incidence, the reflected beam of light having a polarization;

polarization rotating means for rotating the polarization of the reflected beam of light;

reflecting means for reflecting the reflected beam of light to form the second beam of light; and the polarization rotating means for rotating the polarization of the second beam of light.

3. The optical system of claim 1 wherein said means for producing first and second beams of light further comprise:

a first light source for providing a modulated beam of light;

a beam splitter for receiving the modulated beam and dividing the modulated beam into the first and second beams of light; and beam directing means for receiving the first and second beams of light and for directing the first and second beams of light toward the intersection plane from different directions.

4. An optical communication device comprising:
a first photon source for providing a first beam of photons modulated with information;
an intersection plane for intersecting the first beam of photons at a first angle of incidence and for reflecting a first portion of the first beam of photons to form a reflected beam of photons propagating at a second angle of incidence, the reflected beam of photons having a polarization;
polarization rotating means for rotating the polarization of the reflected beam of photons;
reflecting means for reflecting the reflected beam of photons to form a second beam of photons;
the polarization rotating means further for rotating the polarization of the second beam of photons;
the intersection plane further for receiving the second beam of photons at the second incidence angle, and for intersecting the second beam of photons with the first beam of photons;
a second photon source for providing a third beam of photons intersecting the first and second beams of photons at the intersection plane; and
layer disposed at the intersection plane which is transmissive to the third beam of photons, where interaction between the first, second, and third beams of photons on the layer operates to modulate the third beam of photons with the information as the third beam of photons passes through the layer.

5. The optical communication device of claim 4 wherein the intersection plane is operable to intersect the first beam of photons and reflect the first portion of the first beam of photons such that the first and second angles of incidence are substantially equivalent.

6. The optical communication device of claim 4 wherein the layer is operable to support a first surface plasmon wave formed by the first beam of photons and a second surface plasmon wave formed by the second beam of photons, where interaction between the first and second surface plasmon waves forms a surface plasmon standing wave on the layer which modulates the third beam of photons with the information.

7. The optical communication device of claim 6 wherein the layer is operable to scatter the third beam of photons in a diffraction pattern having a central peak portion and side peak portions spatially disposed on either side of the central peak portion.

8. The optical communication device of claim 7 further comprising:
a first photon collection device operable to receive the first peak portion; and
at least one second photon collection device operable to receive at least one of the side peak portions.

9. The optical communication device of claim 4 further comprising at least one photon collection device operable to receive at least a portion of the third beam of photons modulated with the information.

10. The optical communication device of claim 9 wherein the photon collection device comprises a photosensitive detector.

11. The optical communication device of claim 9 wherein the photo collection device comprises an optical waveguide.

12. The optical communication device of claim 4 wherein the first photon source comprises a diode laser.

13. The optical communication device of claim 4 wherein the second photon source comprises a continuous-wave laser selected from a group consisting of ultraviolet lasers and visible light lasers.

14. The optical communication device of claim 4 wherein the layer has a negative permittivity.

15. The optical communication device of claim 4 wherein the layer comprises a metal film.

16. The optical communication device of claim 4 further comprising:
a plano-convex cylindrical lens disposed between the first photon source and the layer, and having a planar surface substantially coplanar with the intersection plane; and
the layer comprising a metal film disposed on the planar surface of the plano-convex cylindrical lens.

17. The optical communication device of claim 4 wherein the reflecting means further comprise a mirror for receiving the reflected beam of photons and directing the second beam of photons toward the intersection plane.

18. The optical communication device of claim 4 wherein the polarization rotating means further comprise a Faraday cell.

19. An optical communication device comprising:
a first photon source for providing a first beam of photons modulated with information;
a beam splitter for receiving the first beam of photons and dividing the first beam of photons into second and third beams of photons;
beam directing means for directing the second beam of photons in a second direction, and for directing the third beam of photons in a third direction which is different from the second direction, such that the second and third beams of photons intersect at an intersection plane, there being a second incidence angle between the second beam of photons and the intersection plane, and a third incidence angle between the third beam of photons and the intersection plane;
a second photon source for providing a fourth beam of photons in a fourth direction, the fourth beam of photons intersecting the second and third beams of photons at the intersection plane; and
a layer disposed at the intersection plane which is transmissive to the fourth beam of photons, where interaction between the second, third, and fourth beams of photons on the layer operates to modulate the fourth beam of photons with the information as the fourth beam of photons passes through the layer.

20. The optical communication device of claim 19 wherein the beam directing means further comprise:
a first mirror for receiving the second beam of photons from the beam splitter and directing the second beam of photons in the second direction; and
a second mirror for receiving the third beam of photons from the beam splitter and directing the third beam of photons in the third direction.

21. An optical communication device comprising:
a first photon source for providing a first beam of photons modulated with information;
an intersection plane for intersecting the first beam of photons at a first angle of incidence and for reflecting a first portion of the first beam of photons to form a reflected beam of photons propagating at a second angle of incidence which is substantially equivalent to the first angle of incidence, the reflected beam of photons having a polarization;

polarization rotating means for rotating the polarization of the reflected beam of photons;

reflecting means for reflecting the reflected beam of photons to form a second beam of photons;

the polarization rotating means further for rotating the polarization of the second beam of photons;

a plano-convex cylindrical lens having a convex surface for receiving the first and second beams of photons, and having a planar surface substantially coplanar with the intersection plane;

a second photon source for providing a third beam of photons intersecting the first and second beams of photons at the intersection plane;

a metal film disposed on the planar surface of the plano-convex lens, the metal film transmissive to the third beam of photons, the film operable to support a first surface plasmon wave formed by the first beam of photons and a second surface plasmon wave formed by the second beam of photons, where interaction between the first and second surface plasmon waves forms a surface plasmon standing wave on the film which modulates the third beam of photons with the information, the film further operable to scatter the third beam of photons in a diffraction pattern having a central peak portion and side peak portions spatially disposed on either side of the central peak portion;

a first photon collection device operable to receive the first peak portion; and at least one second photon collection device operable to receive at least one of the side peak portions.

22. An optical communication device comprising:

a first photon source for providing a first beam of photons modulated with information;

a beam splitter for receiving the first beam of photons and dividing the first beam of photons into second and third beams of photons;

a first mirror for receiving the second beam of photons from the beam splitter and directing the second beam of photons in a second direction;

a second mirror for receiving the third beam of photons from the beam splitter and directing the third beam of photons in a third direction which is different from the second direction, such that the second and third beams of photons intersect at an intersection plane, there being a second incidence angle between the second beam of photons and the intersection plane, and a third incidence angle between the third beam of photons and the intersection plane, where the second and third incidence angles are substantially equivalent;

a plano-convex cylindrical lens having a convex surface for receiving the second beam of photons from the first mirror and the third beam of photons from the second mirror, and having a planar surface substantially coplanar with the intersection plane;

a second photon source for providing a fourth beam of photons that intersects the second and third beams of photons at the intersection plane; and a metal film disposed on the planar surface of the plano-convex cylindrical lens, the metal film transmissive to the fourth beam of photons and operable to support a first surface plasmon wave formed by the second beam of photons and a second surface plasmon wave formed by the third beam of photons, where interaction between the first and second surface plasmon waves forms a surface plasmon standing wave on the metal film which modulates the fourth beam of photons with the information as the fourth beam of photons passes through the metal film, the metal film operable to scatter the fourth beam of photons in a diffraction pattern having a central peak portion and side peak portions spatially disposed on either side of the central peak portion;

a first photon collection device operable to receive the first peak portion; and at least one second photon collection device operable to receive at least one of the side peak portions.

23. An optical communication method, comprising:

modulating at least one of first and second beams of light with information;

intersecting the first and second beams of light at an intersection plane at first and second angles of incidence, respectively, relative to a normal of the intersection plane;

producing a standing wave at the intersection plane based on interaction between the first and second beams of light;

intersecting a third beam of light with the standing wave at the intersection plane;

modulating the third beam of light with the information based upon interaction with the standing wave; and substantially transmitting the third beam of light through the intersection plane.

24. A method for modulating a carrier beam of photons with information carried by a first beam of photons, comprising:

(a) propagating a first beam of photons in a first direction;

(b) reflecting a portion of the first beam to form a reflected beam of photons propagating in a second direction;

(c) reflecting the reflected beam to form a second beam of photons which is substantially collinear with the reflected beam and which propagates in a third direction opposite the second direction, the second beam having a polarization;

(d) rotating the polarization of the second beam;

(e) intersecting the first and second beams of photons at an intersection plane, there being a first incidence angle between the first beam of photons and the intersection plane, and a second incidence angle between the second beam of photons and the intersection plane, where the first incidence angle is substantially equivalent to the second incidence angle;

(f) propagating a carrier beam of photons toward the intersection plane;

(g) intersecting the carrier beam of photons with the first and second beams of photons at the intersection plane; and (h) modulating the carrier beam of photons with the information as the carrier beam of photons passes through the intersection plane, the modulating based on interaction between the first, second, and carrier beams of photons at the intersection plane.

25. The method of claim 24 wherein step (e) further comprises:

(e1) forming a first surface plasmon wave corresponding to the first beam of photons;

(e2) forming a second surface plasmon wave corresponding to the second beam of photons; and (e3) forming a surface plasmon standing wave based on interaction between the first and second surface plasmon waves.

26. The method of claim 24 wherein step (g) further comprises scattering the carrier beam of photons in a diffraction pattern having a central peak portion and side peak portions spatially disposed on either side of the central peak portion.

27. The method of claim 24 wherein:

step (e) further comprises:

(e1) providing a metal film at the intersection plane, the metal film transmissive to the carrier beam of photons; and (e2) intersecting the first and second beams of photons on the metal film;

step (g) further comprises intersecting the carrier beam of photons with the first and second beams of photons at the metal film; and step (h) further comprises modulating the carrier beam of photons with the information as the carrier beam of photons passes through the metal film.

28. A method for modulating a carrier beam of photons with information carried by a first beam of photons, comprising:

(a) propagating a first beam of photons in a first direction;

(b) dividing the first beam of photons into second and third beams of photons;

(c) directing the second beam of photons in a second direction;

(d) directing the third beam of photons in a third direction which is different from the second direction;

(e) intersecting the second and third beams of photons at an intersection plane, there being a second incidence angle between the second beam of photons and the intersection plane, and a third incidence angle between the third beam of photons and the intersection plane, where the second incidence angle is substantially equivalent to the third incidence angle;

(f) propagating a carrier beam of photons toward the intersection plane;

(g) intersecting the carrier beam of photons with the second and third beams of photons at the intersection plane; and (h) modulating the carrier beam of photons with the information as the carrier beam of photons passes through the intersection plane, the modulating based on interaction between the second, third, and carrier beams at the intersection plane.

* * * * *